United States Patent
Chang et al.

(10) Patent No.: US 11,072,548 B2
(45) Date of Patent: Jul. 27, 2021

(54) COMPOSITION AND METHOD FOR INCREASING DISSOLVED OXYGEN IN AQUACULTURE WATER

(71) Applicant: SYNBIO TECH INC., Kaohsiung (TW)

(72) Inventors: Hsiao-Tung Chang, Tainan (TW); Kuei-Ming Li, Taichung (TW); Jin-Seng Lin, Tainan (TW)

(73) Assignee: SYNBIO TECH INC., Kaohsiung (TW)

( * ) Notice: Subject to any disclaimer, the term of this patent is extended or adjusted under 35 U.S.C. 154(b) by 77 days.

(21) Appl. No.: 16/249,598

(22) Filed: Jan. 16, 2019

(65) Prior Publication Data

US 2020/0223728 A1 Jul. 16, 2020

(51) Int. Cl.
*C02F 3/34* (2006.01)
*C02F 103/20* (2006.01)

(52) U.S. Cl.
CPC .............. *C02F 3/341* (2013.01); *C02F 3/348* (2013.01); *C02F 2103/20* (2013.01)

(58) Field of Classification Search
CPC .. C02F 2103/20; C02F 2209/22; C02F 3/341; C02F 3/348
See application file for complete search history.

(56) References Cited

U.S. PATENT DOCUMENTS 9,908,799 B2 * 3/2018 Greenwald ............. C02F 3/105

FOREIGN PATENT DOCUMENTS

| CN | 104894028 A | | 9/2015 |
| CN | 106660843 A | | 5/2017 |
| CN | 10896729 A | * | 12/2018 |
| CN | 108967269 A | * | 12/2018 |
| TW | 201106957 A1 | | 3/2011 |
| TW | I433651 | | 4/2014 |

OTHER PUBLICATIONS

Search Report appended to an Office Action, which was issued to Chinese counterpart application No. 201710639568.1 by the CNIPA dated Dec. 13, 2019 with an English translation thereof.
Song Rong, et al."The study of nitrite degradation mechanism by a strain Lactobacillus casei in aquaculture water" Freshwater Fisheries, vol. 43 No. 1, pp. 3-8 (Jan. 2013) with English abstract.

* cited by examiner

*Primary Examiner* — Blaine Lankford
(74) *Attorney, Agent, or Firm* — Hamre, Schumann, Mueller & Larson, P.C.

(57) ABSTRACT

Disclosed herein is a composition that includes *Lactobacillus plantarum* LP28, *Pediococcus pentosaceus* PP4012, and *Lactobacillus fermentum* LF26 respectively deposited at the China General Microbiological Culture Collection Center (CGMCC) under accession numbers CGMCC 3346, 5235 and 14166. Also disclosed herein is a method of increasing dissolved oxygen in aquaculture water, including treating the aquaculture water with the composition.

11 Claims, No Drawings
Specification includes a Sequence Listing.

SEQUENCE LISTING

<160> NUMBER OF SEQ ID NOS: 6

<210> SEQ ID NO 1
<211> LENGTH: 20
<212> TYPE: DNA
<213> ORGANISM: Artificial Sequence
<220> FEATURE:
<223> OTHER INFORMATION: primer F1 for amplifying 16S rDNA

<400> SEQUENCE: 1
agagtttgat cmtggctcag                                                  20

<210> SEQ ID NO 2
<211> LENGTH: 20
<212> TYPE: DNA
<213> ORGANISM: Artificial Sequence
<220> FEATURE:
<223> OTHER INFORMATION: primer R1 for amplifying 16S rDNA

<400> SEQUENCE: 2
cggttacctt gttacgactt                                                  20

<210> SEQ ID NO 3
<211> LENGTH: 1538
<212> TYPE: DNA
<213> ORGANISM: Lactobacillus fermentum
<220> FEATURE:
<221> NAME/KEY: misc_feature
<222> LOCATION: (276)..(276)
<223> OTHER INFORMATION: n is a, c, g, or t

<400> SEQUENCE: 3
gctcaggatg aacgccggcg gtgtgcctaa tacatgcaag tcgaacgcgt tggcccaatt        60
gattgatggt gcttgcacct gattgatttt ggtcgccaac gagtggcgga cgggtgagta       120
acacgtaggt aacctgccca gaagcggggg acaacatttg gaaacagatg ctaataccgc       180
ataacaacgt tgttcgcatg aacaacgctt aaaagatggc ttctcgctat cacttctgga       240
tggacctgcg gtgcattagc ttgttggtgg ggtaanggcc taccaaggcg atgatgcata       300
gccgagttga gagactgatc ggccacaatg ggactgagac acggcccata ctcctacggg       360
aggcagcagt agggaatctt ccacaatggg cgcaagcctg atggagcaac accgcgtgag       420
tgaagaaggg tttcggctcg taaagctctg ttgttaaaga agaacacgta tgagagtaac       480
tgttcatacg ttgacggtat ttaaccagaa agtcacggct aactacgtgc cagcagccgc       540
ggtaatacgt aggtggcaag cgttatccgg atttattggg cgtaaagaga gtgcaggcgg       600
ttttctaagt ctgatgtgaa agccttcggc ttaaccggag aagtgcatcg gaaactggat       660
aacttgagtg cagaagaggg tagtggaact ccatgtgtag cggtggaatg cgtagatata       720
tggaagaaca ccagtggcga aggcggctac ctggtctgca actgacgctg agactcgaaa       780
gcatgggtag cgaacaggat tagatacccct ggtagtccat gccgtaaacg atgagtgcta       840
ggtgttggag ggtttccgcc cttcagtgcc ggagctaacg cattaagcac tccgcctggg       900
gagtacgacc gcaaggttga aactcaaagg aattgacggg ggcccgcaca agcggtggag       960
catgtggttt aattcgaagc tacgcgaaga accttaccag gtcttgacat cttgcgccaa      1020
ccctagagat agggcgtttc cttcgggaac gcaatgacag gtggtgcatg gtcgtcgtca      1080
gctcgtgtcg tgagatgttg ggttaagtcc cgcaacgagc gcaacccttg ttactagttg      1140
ccagcattaa gttgggcact ctagtgagac tgccggtgac aaaccggagg aaggtgggga      1200
cgacgtcaga tcatcatgcc ccttatgacc tgggctacac acgtgctaca atggacggta      1260

```
caacgagtcg cgaactcgcg agggcaagca aatctcttaa aaccgttctc agttcggact    1320
gcaggctgca actcgcctgc acgaagtcgg aatcgctagt aatcgcggat cagcatgccg    1380
cggtgaatac gttcccgggc cttgtacaca ccgcccgtca caccatgaga gtttgtaaca    1440
cccaaagtcg gtggggtaac cttttaggag ccagccgcct aaggtgggac agatgattag    1500
ggtgaagtcg taacaaggta gccgtaggag aacctgcg                           1538

<210> SEQ ID NO 4
<211> LENGTH: 19
<212> TYPE: DNA
<213> ORGANISM: Artificial Sequence
<220> FEATURE:
<223> OTHER INFORMATION: primer F2 for amplifying pheS gene
<220> FEATURE:
<221> NAME/KEY: misc_feature
<222> LOCATION: (6)..(6)
<223> OTHER INFORMATION: n is a, c, g, or t

<400> SEQUENCE: 4
cayccngchc gygayatgc                                                 19

<210> SEQ ID NO 5
<211> LENGTH: 20
<212> TYPE: DNA
<213> ORGANISM: Artificial Sequence
<220> FEATURE:
<223> OTHER INFORMATION: primer R2 for amplifying pheS gene

<400> SEQUENCE: 5
ccwarvccra argcaaarcc                                                20

<210> SEQ ID NO 6
<211> LENGTH: 431
<212> TYPE: DNA
<213> ORGANISM: Lactobacillus fermentum

<400> SEQUENCE: 6
gtgaccccgt ctgttttgat gcggacccaa acgtcgccaa tgcaggcccg gatgctggaa      60
caacacgact tctccaaggg gccgttgaag atgatctcac cggggaaggt ttaccgccgc     120
gacaccgatg acgctaccca cagccaccaa ttccaccagg ttgaaggaat cgtggtcggt     180
gaacacgtca cgatggccga tttaaagggg accctagagg cggtggccca aaacctgttt     240
ggcgaccagc tcaaggtgcg tctgcgcccg agttacttcc cgttcacgga accgtccgtc     300
gaggccgaca tcacttgctt taattgcctg ggggccggtt gctcaatctg taagggaact     360
ggttggatcg aggtgttggg ggccggaatg gtgcacccaa acgtcttgaa gatgtctggc     420
gtcgacccgg a                                                         431
```

COMPOSITION AND METHOD FOR INCREASING DISSOLVED OXYGEN IN AQUACULTURE WATER

FIELD

The disclosure relates to a composition including three lactic acid bacteria isolates, and a method of increasing dissolved oxygen in aquaculture water using the composition.

BACKGROUND

In an aquaculture system, debris and excrement from aquatic animals and accumulation of non-consumed feed would decrease dissolved oxygen in aquaculture water, which may promote anaerobic digestion that produces toxic substances, and fuel the growth of pathogens. In addition, low concentration of dissolved oxygen in aquaculture water is identified as a major cause of stress, poor appetite, slow growth, disease susceptibility and mortality in aquatic animals. Normally, the dissolved oxygen needs to be maintained at a concentration of 4 to 8 mg/L for fish farming, and at a concentration of 6 to 8 mg/L for shrimp farming.

Conventional methods to improve dissolved oxygen in aquaculture water include: (1) mechanical aeration using aerators to mix air and the aquaculture water so that oxygen can be absorbed into the water; and (2) chemical oxygenation using an oxygenating agent (such as sodium peroxide and calcium peroxide) to treat the aquaculture water so as to generate oxygen. However, the use of aerators in the process of mechanical aeration requires massive power consumption that may incur a high operating cost. On the other hand, the use of oxygenating agents could generate metal ions that increase the pH value of the aquaculture water, resulting in adverse health effects to the aquatic animals. Therefore, researchers in this field have attempted to develop safe and low-cost methods to increase the dissolved oxygen concentration in aquaculture water.

Lactic acid bacteria (LAB) are gram-positive bacteria that produce lactic acid as the major metabolic end product of carbohydrate fermentation. These bacteria, which are usually found in pickled food, dairy products, and intestinal tract mucosa of animals, share common physiological characteristics, including rod-shaped (bacilli) or spherical (cocci), catalase-negative, devoid of cytochrome, non-sporulating and non-motile.

Lactic acid bacteria are conferred with the generally recognized as safe (GRAS) status, and are widely used as probiotics. Such LAB includes *Lactobacillus* spp., *Lactococcus* spp., *Pediococcus* spp., *Streptococcus* spp., *Enterococcus* spp., etc. LAB has been shown to be capable of inhibiting the growth of pathogenic bacteria in gastrointestinal tract and alleviating lactose intolerance, and have immunoregulation, anti-cancer and blood pressure lowering effects.

As reported in R. SONG et al. (2003), Freshwater Fisheries, 43:1-8, R. SONG et al. found that *Lactobacillus casei* L821a is capable of promoting nitrite degradation in the aquaculture water by virtue of intracellular enzymolysis and also by direct chemical reaction of its metabolite (i.e., lactic acid) and the resulting indirect effect of the lactic acid to promote microbial denitrification.

In a previous study, the applicants found that a mixture including *Lactobacillus plantarum* LP28 (BCRC 910435), *Pediococcus pentosaceus* PP4012 (BCRC 910480), *Lactobacillus fermentum*, *Lactobacillus rhamnosus*, *Lactobacillus paracasei* and *Bacillus subtilis* is capable of improving gastrointestinal tract function, immunity, feed conversion rate and growth rate of aquatic fish and shrimps. As far as the applicants are aware, use of LAB strains to increase dissolved oxygen in aquaculture water has yet to be disclosed.

SUMMARY

Accordingly, the present disclosure provides a method of increasing dissolved oxygen in aquaculture water, including the step of treating the aquaculture water with a composition including *Lactobacillus plantarum* LP28, *Pediococcus pentosaceus* PP4012, and *Lactobacillus fermentum* LF26, which are deposited at the China General Microbiological Culture Collection Center (CGMCC) under accession numbers CGMCC 3346, 5235 and 14166, respectively.

The present disclosure also provides a composition for increasing dissolved oxygen in aquaculture water, which includes the above mentioned three lactic acid bacteria isolates.

Other features and advantages of the disclosure will become apparent in the following detailed description of the embodiments.

DETAILED DESCRIPTION

For the purpose of this specification, it will be clearly understood that the word "comprising" means "including but not limited to", and that the word "comprises" has a corresponding meaning.

Unless defined otherwise, all technical and scientific terms used herein have the meaning commonly understood by a person skilled in the art to which the present disclosure belongs. One skilled in the art will recognize many methods and materials similar or equivalent to those described herein, which could be used in the practice of the present disclosure. Indeed, the present disclosure is in no way limited to the methods and materials described.

As used herein, the term "tank" refers to any type of tank, basin, container or reservoir for holding a liquid, and may include, but is not limited to, artificial reservoirs, such as artificial lakes or ponds, as well as manufactured reservoirs, such as basins or containers and in particular tanks or reservoirs used in aquaculture.

The present disclosure provides a composition for increasing dissolved oxygen in aquaculture water. The composition includes three lactic acid bacteria (LAB) strains, i.e., *Lactobacillus plantarum* LP28, *Pediococcus pentosaceus* PP4012, and *Lactobacillus fermentum* LF26 respectively deposited at the China General Microbiological Culture Collection Center (CGMCC) under accession numbers CGMCC 3346, 5235 and 14166.

The present disclosure also provides a method of increasing dissolved oxygen in aquaculture water, including treating the aquaculture water with the above mentioned composition.

In certain embodiments, *Lactobacillus plantarum* LP28, *Pediococcus pentosaceus* PP4012 and *Lactobacillus fermentum* LF26 in the composition are present in a weight ratio ranging from 1:1:1 to 1:2:1. In an exemplary embodiment, the weight ratio of *Lactobacillus plantarum* LP28, *Pediococcus pentosaceus* PP4012 and *Lactobacillus fermentum* LF26 is 1:2:1.

According to this disclosure, the composition may have a bacterial concentration ranging from $10^5$ colony-forming unit (CFU)/g to $10^9$ CFU/g. In certain embodiments, the composition has a bacterial concentration ranging from $10^6$ CFU/g to $10^9$ CFU/g.

According to this disclosure, the three LAB strains of the composition may be used alone or in association with a feed acceptable carrier.

As used herein, the term "feed acceptable carrier" refers to any carrier that is compatible with the LAB strains of the disclosure and can be given to an aquatic animal without adverse effects. For instance, the feed acceptable carrier may include one or more of the following agents: solvents, buffers, suspending agents, decomposers, disintegrating agents, dispersing agents, binding agents, excipients, stabilizing agents, chelating agents, diluents, gelling agents, preservatives, lubricants, absorption delaying agents, liposomes, and the like. The choice and amount of the aforesaid agents are within the expertise and routine skills of those skilled in the art.

Moreover, before treating the aquaculture water, the composition may be further incorporated with an aquaculture feed using a standard technique well known to one of ordinary skill in the art. For instance, these LAB strains may be directly added to an aquaculture feed, or may be utilized for preparing an intermediate composition (e.g., a feed additive or a premix) suitable to be subsequently added to an aquaculture feed. In certain embodiments, after mixing with the aquaculture feed, the resultant composition was used to treat the aquaculture water.

In certain embodiments, the composition of this disclosure is mixed with the aquaculture feed in a weight ratio ranging from 1:100 to 1:999. In an exemplary embodiment, the composition and the aquaculture feed are mixed in a weight ratio of 1:999.

According to this disclosure, in the aquaculture water, an aquatic organism may be farmed.

As used herein, the term "aquatic organism" includes all biological organisms living or growing in, on, or near an aqueous environment, such as an ocean, a bay, a lake, a river, wastewater, etc.

Examples of the aquatic organism suitable for used in this disclosure may include, but are not limited to, fishes, crustaceans, mollusks, echinoderms, shellfishes, snails, other invertebrates and their life stages, as well as aquatic plants.

In certain embodiments, the aquatic organism farmed in the aquaculture water is a shrimp. Examples of the shrimps suitable for used in this disclosure may include, but are not limited to, *Litopenaeus vannamei, Macrobrachium rosenbergii, Penaeus monodon, Penaeus japonicus, Penaeus stylirostris, Penaeus merguiensis*, and combinations thereof. In an exemplary embodiment, the shrimp is *Litopenaeus vannamei*. In addition, the shrimp may be farmed in the aquaculture water with a stocking density ranging from 50 shrimps per square meter to 250 shrimps per square meter. In an exemplary embodiment, the shrimps are farmed in the aquaculture water with a stocking density of about 91 shrimps per square meter.

In certain embodiments, the aquatic organism farmed in the aquaculture water is a fish. Examples of the fish suitable for used in this disclosure may include, but are not limited to, *Epinephelus fuscoguttatus, Epinephelus lanceolatus, Epinephelus coioides, Lates calcarifer, Lateolabrax japonicus, Chanos chanos, Oreochromis mossambicus, Anguilliformes, Mugil cephalus, Eleutheronema rhadinum, Larimichthys crocea*, and combinations thereof. In an exemplary embodiment, the fish is *Epinephelus fuscoguttatus*. In addition, the fish may be farmed in the aquaculture water with a stocking density ranging from 5 fish per square meter to 12 fish per square meter. In an exemplary embodiment, the fish are farmed in the aquaculture water with a stocking density of about 6 fish per square meter.

The present disclosure will be further described in the following examples. However, it should be understood that the following examples are solely intended for the purpose of illustration and should not be construed as limiting the present disclosure in practice.

EXAMPLES

General Experimental Materials:
1. Lactic Acid Bacteria (LAB) Strains
A. *Lactobacillus plantarum* LP28

*Lactobacillus plantarum* LP28, which is disclosed in the applicants' previous Taiwanese Invention Application Publication No. 201106957, has been deposited at the Bioresource Collection and Research Center (BCRC) of the Food Industry Research and Development Institute (FIRDI) (331 Shih-Pin Rd., Hsinchu City 300, Taiwan) under accession number BCRC 910435 since Jul. 14, 2009, as well as at the China General Microbiological Culture Collection Center (CGMCC) (No. 1 Beichen West Road, Chaoyang District, Beijing 100101, China) under accession number CGMCC 3346 since Oct. 19, 2009.

B. *Pediococcus pentosaceus* PP4012

*Pediococcus pentosaceus* PP4012 (also known as *P. pentosaceus* PP49), which is disclosed in the applicants' previous Taiwanese invention Patent Publication No. I433651, has been deposited at the BCRC of the FIRDI under accession number BCRC 910480 since Jul. 22, 2010, as well as at the CGMCC under accession number CGMCC 5235 since Sep. 9, 2011.

C. *Lactobacillus fermentum* LF26

A lactic acid bacteria (LAB) isolate, LF26, was isolated and screened by the applicants from a dairy product using Difco™ Lactobacilli MRS Agar. According to the results of preliminary characteristic determination, such LAB isolate is gram-positive and catalase-negative, and grows under anaerobic condition. In addition, based on acid, salt and bile salt tolerance tests, the LAB isolate was found to survive under a condition of pH 2.0 and in the presence of 5% NaCl and 0.3% ox gall.

The genomic DNA of the LAB isolate LF26 was extracted to conduct polymerase chain reaction (PCR) respectively for amplifying the 16S rDNA using a forward primer F1 (SEQ ID NO: 1) and a reverse primer R1 (SEQ ID NO: 2), and for amplifying the pheS gene using a forward primer F2 (SEQ ID NO: 4) and a reverse primer R2 (SEQ ID NO: 5), so as to obtain the 16S rDNA fragment and the pheS gene fragment of the LAB isolate LF26.

Sequencing of the 16S rDNA fragment and the pheS gene fragment was conducted by Mission Biotech Co. Ltd., so as to obtain the partial 16S rDNA sequence (SEQ ID NO: 3) and the partial pheS gene sequence (SEQ ID NO: 6) of the LAB isolate LF26. Through comparison with nucleotide sequences obtained from the NCBI database, it was found that the partial 16S rDNA sequence and the partial pheS gene sequence of the LAB isolate LF26 have a highest percentage of identity to those of *Lactobacillus fermentum*.

In addition, the LAB isolate LF26 was also subjected to the determination of the carbohydrate fermentation profile using API 50 CHL identification system (bioMérieux). The result is shown in Table 1 below.

TABLE 1

| Carbohydrate | Capability of fermenting carbohydrate tested to produce acid* |
|---|---|
| Glycerol | − |
| Erythritol | − |
| D-Arabinose | − |
| L-Arabinose | − |
| Ribose | + |
| D-Xylose | − |
| L-Xylose | − |
| Adonitol | − |
| Methyl-β-D-xylopyranoside | − |
| Galactose | + |
| Glucose | + |
| Fructose | + |
| Mannose | + |
| Sorbose | − |
| Rhamnose | − |
| Dulcitol | − |
| Inositol | − |
| Mannitol | − |
| Sorbitol | − |
| Methyl-α-D-mannopyranoside | − |
| Methyl-α-D-glucopyranoside | + |
| N-acetylglucosamine | − |
| Amygdalin | − |
| Arbutin | − |
| Esculin | + |
| Salicin | − |
| Cellobiose | − |
| Maltose | + |
| Lactose | + |
| Melibiose | + |
| D-Saccharose | + |
| Trehalose | − |
| Inulin | − |
| Melezitose | − |
| Raffinose | + |
| Amidon | − |
| Glycogen | − |
| Xylitol | − |
| Gentiobiose | − |
| D-Turanose | − |
| D-Lyxose | − |
| Tagatose | − |
| D-Fucose | − |
| L-Fucose | − |
| D-Arabitol | − |
| L-Arabitol | − |
| Gluconate | + |
| Potassium 2-ketogluconate | − |
| Potassium 5-ketogluconate | + |

*: "+" indicates that lactic acid bacteria strain LF26 is capable of fermenting the carbohydrate tested to produce an acid, whereas "−" indicates that the strain has no such capability.

In view of the aforesaid experimental results, the LAB isolate LF26 of the present disclosure is deemed to be a new strain of *Lactobacillus fermentum*.

*Lactobacillus fermentum* strain LF26 of the present disclosure has been deposited at the BCRC of the FIRDI under accession number BCRC 910752 since Nov. 3, 2016, and at the CGMCC under accession number CGMCC 14166 since May 15, 2017.

2. Aquatic Organisms

*Litopenaeus vannamei* (7 days old, body weight: about 0.0034 g) and *Epinephelus coioides* (244 days old, body weight: about 324 g) were respectively purchased from a larval shrimp aquafarm (Linyuan District, Kaohsiung City, Taiwan) and a larval grouper aquafarm (Yong-An District, Kaohsiung City, Taiwan). All aquatic organisms were farmed in an outdoor aquaculture pond full of water, and feed was sufficiently provided.

Example 1

Evaluation for the Effect of LAB Composition on the Dissolved Oxygen in Aquaculture Water for Shrimp Farming Experimental Materials:
1. Preparation of LAB Composition

*Lactobacillus plantarum* LP28, *Pediococcus pentosaceus* PP4012 and *Lactobacillus fermentum* LF26 were respectively inoculated in an amount of 3% (v/v) into 4.5 L of a seed media as shown in Table 2, and then cultured anaerobically at 37° C. for 18 hours. The resultant culture was poured into 150 L of the seed media and was further cultured at 37° C. for 16 hours.

TABLE 2

| Ingredients | Concentration (g/L) |
|---|---|
| Glucose | 20 |
| skim milk powder | 20 |
| Tween-80 | 1 |
| Yeast extract | 20 |
| $MnSO_4$ | 0.05 |
| $K_2HPO_4$ | 3 |

The balance is distilled water.

After centrifugation at 12,000 rpm for 30 minutes, the cell pellet was washed with normal saline, followed by subjecting the cells to cell counting using a plate count agar. After lyophilization, the resultant lyophilized powders (having a bacterial concentration of $10^{11}$ CFU/g) of each strain were obtained, followed by mixing with maltodextrin serving as a carrier in a ratio as shown in Table 3, so as to obtain a LAB composition (having a total bacterial concentration of $10^9$ CFU/g) for subsequent use.

TABLE 3

| Ingredients | Concentration (%) (w/w) |
|---|---|
| *L. plantarum* LP28 | 0.25 |
| *P. pentosaceus* PP4012 | 0.5 |
| *L. fermentum* LF26 | 0.25 |
| Maltodextrin | 99 |

Experiential Procedure:

A plurality of *Litopenaeus vannamei* were divided into a control group (n=88,000) and an experimental group (n=70,400), which were respectively farmed in independent aquaculture ponds full of water having a depth of 100 centimeter with a stocking density of 91 shrimps per square meter. The control group was treated three times a day with a given aquaculture feed (Tung Li Feed Industrial Co., Ltd.) without the LAB composition to achieve a predetermined dose set for a respective one of the treatment period (total period of 112 days) as shown in Table 4.

TABLE 4

| Treatment period (day) | Aquaculture feed | | Dose (kg/day) |
|---|---|---|---|
| | Product name | Cat. No. | |
| 0-20 | Baby shrimp No. P | A005 | 0.6 |
| 21-50 | Baby shrimp No. F | A006 | 4.4 |
| 51-80 | Baby shrimp No. 0 | A007 | 14.5 |
| 81-112 | Baby shrimp No. 1 | A008 | 10.8 |

The experimental group was treated in a manner similar to that of the control group, except that all of the aquaculture feeds were supplemented with 0.1% (w/w) of the LAB composition obtained above.

At Day 49 and Day 112 of the treatment period, dissolved oxygen (DO) (mg/L) at 5 cm below the water surface (i.e., upper dissolved oxygen) and that at 100 cm below the water surface (i.e., bottom dissolved oxygen) of each group, were determined using an oxygen meter (Lutron Electronic Enterprise Co., Ltd., Model No.: DO-5510) at three locations of the aquaculture ponds.

The experimental data are expressed as mean±standard error of the mean (SEM) and were analyzed using Student's test so as to assess the difference between the groups. Statistical significance is indicated by $p<0.05$.

Results:

The results of the determined dissolved oxygen (DO) are shown in Table 5. It can be seen from Table 5 that both of the upper and bottom dissolved oxygen of the experimental group increased with the treatment period, but those of the control group decreased with the treatment period. In particular, at Day 112 of the treatment period, both of the upper and bottom dissolved oxygen of the experimental group show significantly higher values than the respective one of the control group. The results indicate that the LAB composition of this disclosure is effective in increasing the dissolved oxygen in the aquaculture water, and thus is beneficial to shrimp farming.

TABLE 5

| Group | DO | Day 49 | Day 112 |
| --- | --- | --- | --- |
| Experimental group | upper DO (mg/L) | 9.73 ± 0.58 | 10.03 ± 0.06*** |
| | bottom DO (mg/L) | 8.83 ± 0.35** | 9.37 ± 0.21** |
| Control group | upper DO (mg/L) | 9.5 ± 0.2 | 8.77 ± 0.32 |
| | bottom DO (mg/L) | 7.87 ± 0.31 | 7.82 ± 0.21 |

**: $p<0.01$ when compared to the control group.
***: $p<0.001$ when compared to the control group.

Example 2

Evaluation for the Effect of LAB Mixture on the Dissolved Oxygen in Aquaculture Water for Fish Farming Experiential Procedure:

A plurality of *Epinephelus fuscoguttatus* were divided into a control group (approximate 12,000) and an experimental group (approximate 12,000), which were respectively farmed in independent aquaculture ponds full of water having a depth of 240 centimeter with a stocking density of 6 fish per square meter. The control group was treated twice a day with a given aquaculture feed (Uni-President Enterprises Co., Ltd.) without the LAB composition to reach a predetermined dose set for a respective one of the treatment period (total period of 110 days) as shown in Table 6.

TABLE 6

| Treatment period (day) | Aquaculture feed Product name | Dose (kg/day) |
| --- | --- | --- |
| 0-90 | grouper feed No. 5 | 30-55 |
| 91-110 | grouper feed No. 6 | 58-60 |

The experimental group was treated in a manner similar to that of the control group, except that all of the aquaculture feeds were supplemented with 0.1% (w/w) of the LAB composition obtained in Example 1.

At Day 82 and Day 110 of the treatment period, dissolved oxygen (DO) (mg/L) at 5 cm below the water surface (i.e., upper DO), that at 84 cm below the water surface (i.e., middle DO) and that at 240 cm below the water surface (i.e., bottom DO) of each group, were determined using the oxygen meter.

Results:

The results of the determined dissolved oxygen (DO) are shown in Table 7. It can be seen from Table 7 that at Day 82 or Day 110 of the treatment period, all of the upper, middle and bottom dissolved oxygen of the experimental group are higher than the respective one of the control group. The results indicate that the LAB composition of this disclosure is effective in increasing dissolved oxygen in the aquaculture water, which could be beneficial to fish farming.

TABLE 7

| Group | DO | Day 82 | Day 110 |
| --- | --- | --- | --- |
| Experimental group | upper DO (mg/L) | 7.2 | 7.8 |
| | middle DO (mg/L) | 5.8 | 7.2 |
| | bottom DO (mg/L) | 4.1 | 5.8 |
| Control group | upper DO (mg/L) | 5.5 | 6.1 |
| | middle DO (mg/L) | 4.4 | 5.3 |
| | bottom DO (mg/L) | 3.2 | 4.7 |

All patents and literature references cited in the present specification us well as the references described therein, are hereby incorporated by reference in their entirety. In case of conflict, the present description, including definitions, will prevail.

In the description above, for the purposes of explanation, numerous specific details have been set forth in order to provide a thorough understanding of the embodiments. It will be apparent, however, to one skilled in the art, that one or more other embodiments may be practiced without some of these specific details. It should also be appreciated that reference throughout this specification to "one embodiment," "an embodiment," an embodiment with an indication of an ordinal number and so forth means that a particular feature, structure, or characteristic may be included in the practice of the disclosure. It should be further appreciated that in the description, various features are sometimes grouped together in a single embodiment, figure, or description thereof for the purpose of streamlining the disclosure and aiding in the understanding of various inventive aspects, and that one or more features or specific details from one embodiment may be practiced together with one or more features or specific details from another embodiment, where appropriate, in the practice of the disclosure.

While the disclosure has been described in connection with what are considered the exemplary embodiments, it is understood that this disclosure is not limited to the disclosed embodiments but is intended to cover various arrangements included within the spirit and scope of the broadest interpretation so as to encompass all such modifications and equivalent arrangements.

What is claimed is:

1. A method of increasing dissolved oxygen in aquaculture water, comprising:
 treating the aquaculture water with a composition including *Lactobacillus plantarum* LP28, *Pediococcus pentosaceus* PP4012, and *Lactobacillus fermentum* LF26, which are respectively deposited at the China General Microbiological Culture Collection Center (CGMCC) under accession numbers CGMCC 3346, 5235, and 14166.

2. The method as claimed in claim 1, wherein *Lactobacillus plantarum* LP28, *Pediococcus pentosaceus* PP4012, and *Lactobacillus fermentum* LF26 in the composition are present in a weight ratio ranging from 1:1:1 to 1:2:1.

3. The method as claimed in claim 2, wherein *Lactobacillus plantarum* LP28, *Pediococcus pentosaceus* PP4012, and *Lactobacillus fermentum* LF26 in the composition are present in a weight ratio of 1:2:1.

4. The method as claimed in claim 1, wherein the composition further includes an aquaculture feed.

5. The method as claimed in claim 1, wherein the composition further includes a feed acceptable carrier.

6. The method as claimed in claim 1, wherein in the aquaculture water, an aquatic organism is farmed.

7. The method as claimed in claim 6, wherein the aquatic organism is selected from the group consisting of fish, crustacean, mollusks, echinoderm, shellfishes, snails, and combinations thereof.

8. The method as claimed in claim 7, wherein the aquatic organism is a shrimp selected from the group consisting of *Litopenaeus vannamei, Macrobrachium rosenbergii, Penaeus monodon, Penaeus japonicus, Penaeus stylirostris, Penaeus merguiensis*, and combinations thereof.

9. The method as claimed in claim 8, wherein the shrimp is *Litopenaeus vannamei*.

10. The method as claimed in claim 7, wherein the aquatic organism is a fish selected from the group consisting of *Epinephelus fuscoguttatus, Epinephelus lanceolatus, Epinephelus coioides, Lates calcarifer, Lateolabrax japonicus, Chanos chanos, Oreochromis mossambicus, Anguilliformes, Mugil cephalus, Eleutheronema rhadinum, Larimichthys crocea*, and combinations thereof.

11. The method as claimed in claim 10, wherein the fish is *Epinephelus fuscoguttatus*.

\* \* \* \* \*